(12) United States Patent
Xu

(10) Patent No.: US 11,650,563 B2
(45) Date of Patent: May 16, 2023

(54) MACHINE TOOL FOR DETECTING AND CUTTING LOADS USING MACHINE LEARNING

(71) Applicant: FANUC CORPORATION, Yamanashi (JP)

(72) Inventor: Yuanming Xu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 538 days.

(21) Appl. No.: 16/692,054

(22) Filed: Nov. 22, 2019

(65) Prior Publication Data

US 2020/0183352 A1    Jun. 11, 2020

(30) Foreign Application Priority Data

Dec. 5, 2018    (JP) .............................. JP2018-228176

(51) Int. Cl.
    *G05B 19/19*    (2006.01)
    *G05B 13/02*    (2006.01)
(52) U.S. Cl.
    CPC ......... *G05B 19/19* (2013.01); *G05B 13/0265* (2013.01); *G05B 2219/33034* (2013.01); *G05B 2219/37346* (2013.01)
(58) Field of Classification Search
    CPC ................ G05B 19/19; G05B 13/0265; G05B 2219/33034; G05B 2219/37346; G05B 2219/49061; G05B 2219/49065; G05B 2219/49087; G05B 19/404; G05B 19/4083
    See application file for complete search history.

(56) References Cited

U.S. PATENT DOCUMENTS

| | | | |
|---|---|---|---|
| 4,310,878 A * | 1/1982 | Hyatt ..................... | G11C 19/36 700/78 |
| 5,888,037 A | 3/1999 | Fujimoto et al. | |
| 7,101,126 B2 * | 9/2006 | Kakino .................. | G05B 19/00 409/187 |
| 9,658,610 B2 * | 5/2017 | Otsubo .............. | B23Q 17/2233 |

(Continued)

FOREIGN PATENT DOCUMENTS

| | | | | |
|---|---|---|---|---|
| CN | 109283887 A | * | 1/2019 | ........... G05B 19/404 |
| EP | 0801339 A1 | | 10/1997 | |

(Continued)

OTHER PUBLICATIONS

Machine translation of JP2017191536A (Year: 2017).*

(Continued)

*Primary Examiner* — M. N. Von Buhr
(74) *Attorney, Agent, or Firm* — Karceski iP Law, PLLC

(57) ABSTRACT

A machine tool includes: a spindle that causes a tool to rotate and move; a workpiece rotation mechanism that causes a workpiece W to rotate; a control unit that controls the spindle and the workpiece rotation mechanism in accordance with commands from a program; and a cutting load detection unit that detects a cutting load imparted on the workpiece by the tool, and the control unit controls a cutting route such that a cutting depth of the workpiece cut with the tool in a region with a small cutting load is greater than the cutting depth in a region with a large cutting load within such a range that the cutting load detected by the cutting load detection unit does not exceed a predetermined load.

3 Claims, 9 Drawing Sheets

(56) References Cited

U.S. PATENT DOCUMENTS

| | | | |
|---|---|---|---|
| 10,042,922 B2* | 8/2018 | Besuchet | B23Q 17/0976 |
| 10,599,123 B2* | 3/2020 | Kurosumi | G05B 19/182 |
| 10,921,774 B2* | 2/2021 | Matsumura | G05B 19/404 |
| 11,119,464 B2* | 9/2021 | Xu | G05B 19/401 |
| 2015/0127139 A1* | 5/2015 | Bolin | G05B 19/4065 |
| | | | 700/173 |
| 2016/0224004 A1* | 8/2016 | Kurosumi | G05B 19/182 |
| 2017/0031328 A1* | 2/2017 | Sawada | G05B 13/028 |
| 2017/0060104 A1 | 3/2017 | Genma | |
| 2017/0090430 A1* | 3/2017 | Nakazawa | H02P 29/60 |
| 2017/0091667 A1* | 3/2017 | Yukawa | G06N 3/0427 |
| 2017/0108846 A1* | 4/2017 | Sannomiya | B23B 29/125 |
| 2017/0300030 A1* | 10/2017 | Uno | G05B 19/4166 |
| 2017/0315535 A1* | 11/2017 | Ishii | G05B 19/4065 |
| 2017/0357243 A1* | 12/2017 | Takayama | G06N 3/08 |
| 2018/0107947 A1* | 4/2018 | Ogawa | B23Q 15/18 |
| 2018/0181108 A1* | 6/2018 | Nagano | G05B 19/4083 |
| 2018/0210406 A1* | 7/2018 | Shimizu | G05B 13/027 |
| 2018/0231953 A1* | 8/2018 | Watanabe | G05B 19/404 |
| 2018/0284720 A1* | 10/2018 | Uno | G05B 19/4063 |
| 2018/0341244 A1* | 11/2018 | Xu | G05B 19/4163 |

FOREIGN PATENT DOCUMENTS

| | | |
|---|---|---|
| JP | S63150137 A | 6/1988 |
| JP | H03111115 A | 5/1991 |
| JP | H05177504 A | 7/1993 |
| JP | H09120310 A | 5/1997 |
| JP | 2002192424 A | 7/2002 |
| JP | 2003025149 A | 1/2003 |
| JP | 2011173209 A | 9/2011 |
| JP | 2012111009 A | 6/2012 |
| JP | 2013008276 A | 1/2013 |
| JP | 2014140918 A | 8/2014 |
| JP | 6063013 B | 1/2017 |
| JP | 2017045300 A | 3/2017 |
| JP | 2018120357 A | 8/2018 |

OTHER PUBLICATIONS

Japanese Notice of Reasons for Refusal dated Mar. 23, 2021, for Japanese Patent Application No. 2018228176.

Japanese Search Report by Registered Search Organization dated Mar. 12, 2021, for Japanese Patent Application No. 2018228176.

* cited by examiner

MACHINE TOOL FOR DETECTING AND CUTTING LOADS USING MACHINE LEARNING

CROSS-REFERENCE TO RELATED APPLICATIONS

This application is based on and claims priority to Japanese Patent Application No. 2018-228176, filed on Dec. 5, 2018, the entire content of which is incorporated herein by reference.

FIELD OF THE INVENTION

The present invention relates to a machine tool.

BACKGROUND OF THE INVENTION

When machining is performed using a machine tool, a workpiece is machined using a tool depending on a route, a speed, and a spindle rotation frequency designated by a program. For such a machining, a controller is known that is configured to adjust machining conditions, such as a spindle rotation frequency and a feeding speed, such that neither chattering nor tool abrasion/tool breakage occurs in order to avoid influences of chattering and tool abrasion/tool breakage occurring during the machining on the machined surface (see Publication of Japanese Patent No. 6063013, for example).

SUMMARY OF THE INVENTION

An aspect of the invention is directed to a machine tool including: a spindle that causes a tool to rotate and move; a workpiece rotation mechanism that causes a workpiece to rotate; a control unit that controls the spindle and the workpiece rotation mechanism in accordance with commands from a program; and a cutting load detection unit that detects a cutting load imparted on the workpiece by the tool, in which the control unit controls a cutting route such that a cutting depth of the workpiece cut with the tool in a region with a small cutting load is greater than the cutting depth in a region with a large cutting load within such a range that the cutting load detected by the cutting load detection unit does not exceed a predetermined load.

DESCRIPTION OF EMBODIMENT(S) OF THE INVENTION

A machine tool 1 according to an embodiment of the invention will be described below with reference to drawings.

Figure 1:
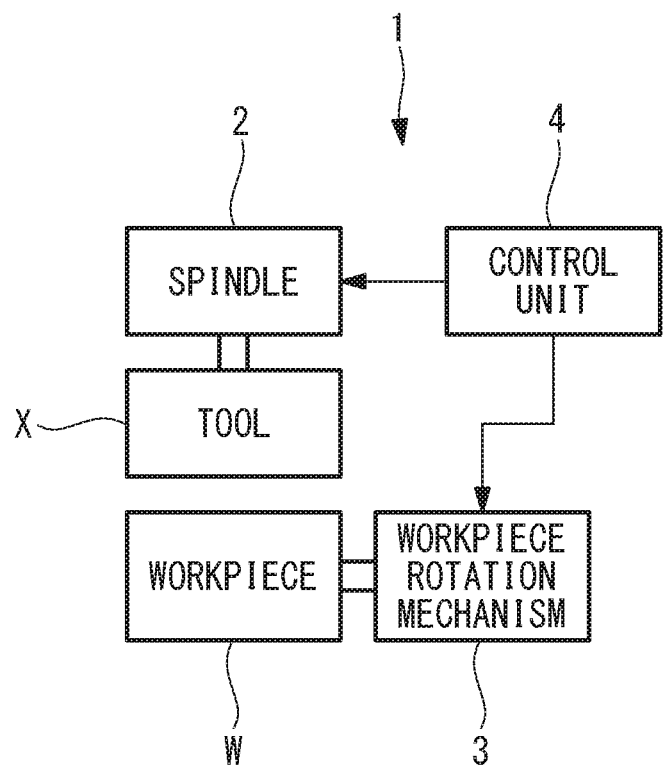
FIG. 1 is a block diagram illustrating a machine tool according to an embodiment of the invention.

The machine tool 1 according to the embodiment includes a spindle 2 that causes a tool X to rotate and move, a workpiece rotation mechanism 3 that causes a workpiece W to rotate, and a control unit 4 that controls the spindle 2 and the workpiece rotation mechanism 3 in accordance with commands from a program P as illustrated in FIG. 1. The control unit 4 is implemented by a memory and a processor.

The control unit 4 analyzes the program P read from the memory, controls the spindle 2 and the workpiece rotation mechanism 3 in the machine tool 1 on the basis of control data obtained as a result of the analysis, and machines the workpiece W. The machine tool 1 includes a sensor that detects a position, a speed, and a rotation frequency of the tool X and a rotation frequency of the workpiece W, which is not illustrated in the drawing, and a sensor that detects a load (cutting load) acting on the motor of the spindle 2 during machining and vibration of the motor. For example, the position, the speed, and the rotation frequency of the tool X and the rotation frequency of the workpiece W are detected by an encoder, a load acting on the motor is detected by a current sensor (cutting load detection unit: omitted in the drawing), and vibration of the motor is detected by a vibration sensor (omitted in the drawing).

The control unit 4 can acquire state data and determination data via these sensors. The control unit 4 includes a state observation unit 5 that acquires the state data from each component of the machine tool 1, a determination data acquisition unit 6 that acquires the determination data, and a machine learning device 7 that serves as an artificial intelligence that performs machine learning.

The state observation unit 5 observes the position of the tool X, the rotation frequency and the feeding speed of the spindle 2, and the rotation frequency of the workpiece W acquired from the control data, which has been obtained as a result of the analysis performed by the program P of the control unit 4, as state data related to a machining state and acquires the observed state data in the machine learning device 7. The acquired state data is stored in the machine learning device 7 and is input to a reward calculation unit 8 and a value function update unit 9, which will be described later.

The input state data may be either data acquired in a latest machining operation or data acquired in a past machining operation. It is also possible to input, store, and output state data stored in another control system or a centralized management system.

The determination data acquisition unit 6 acquires data indicating a motor load of the spindle 2 and vibration data acquired by the sensor as determination data and outputs the determination data to the reward calculation unit 8 of the machine learning device 7.

It is assumed that the machine tool 1 and the control unit 4 are provided with typical configurations of a machine tool and a numerical value controller, and detailed description thereof will be omitted in the specification except for configurations that are especially necessary to explain machine learning operations according to the invention. According to the configuration illustrated in FIG. 2, the machine learning device 7 corresponds to an agent, and each configuration provided in the machine tool 1 except for the machine learning device 7 corresponds to an environment.

To the machine learning device 7, the state data such as the position, the speed, and the rotation frequency of the tool X and the rotation frequency and the like of the workpiece W in machining using the machining tool 1, which have been acquired by the state observation unit 5 and the determination data such as the motor load and the vibration data, which has been acquired by the determination data acquisition unit 6, are input as information for specifying an environment. These are data acquired from each component of the machine tool 1 and data acquired from the control unit 4.

In the embodiment, a command for adjusting a machining path of the tool X and for adjusting a cutting depth is employed as output data in an action output that the machine learning device 7 outputs to the environment.

In the embodiment, a motor load (a positive reward and a negative reward), occurrence of abrasion/breakage of the tool X (negative reward), occurrence of vibration (negative reward), and the like are employed as rewards to be provided in response to the machine learning. An operator may appropriately set which data is to be employed as a ground for deciding a reward.

Figure 3:
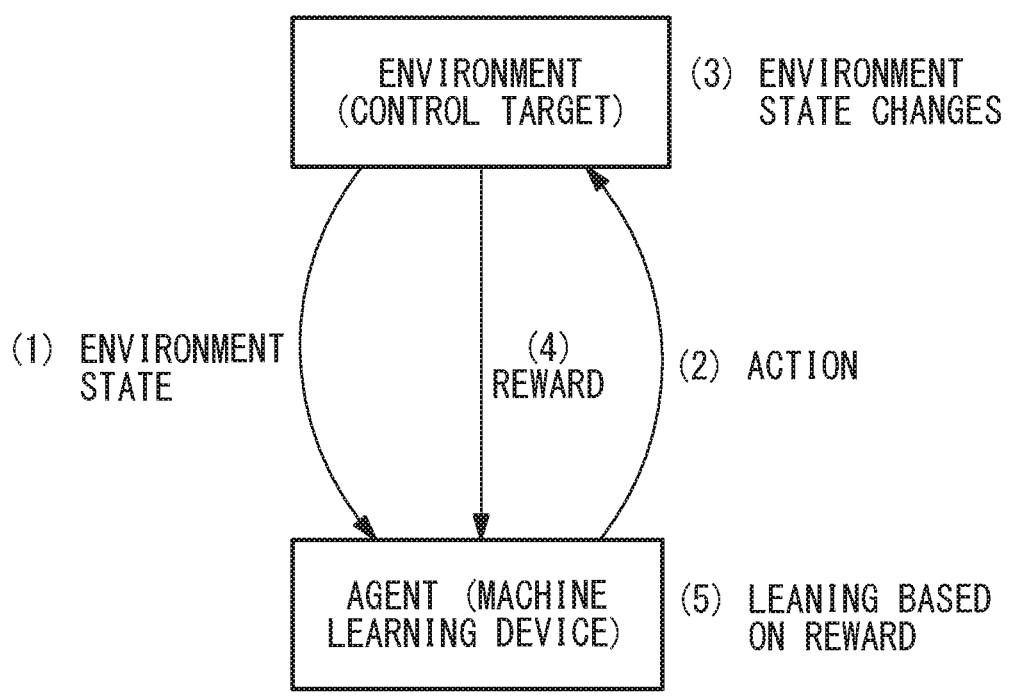
FIG. 3 is a diagram for explaining a basic concept of a reinforcement learning algorithm in the machine tool illustrated in FIG. 1.

The machine learning device 7 performs machine learning on the basis of the state data, the determination data, and the reward described above. In the machine learning (1) observation of a state $s_t$ of an environment using the agent, (2) selection of an action $a_t$ that the agent itself can employ on the basis of the observed state $s_t$ and past learning and execution of the action $a_t$, (3) a change from the state $s_t$ to the next state $s_{t+1}$ of the environment due to the execution of the action $a_t$, (4) reception of a reward $r_{t+1}$ using the agent based on a change in state as a result of the action $a_t$, and (5) proceeding with the learning using the agent based on the state $s_t$, the action $a_t$, the reward $r_{t+1}$, and the result of the past learning are performed between the agent and the environment at a specific clock time t as illustrated in FIG. 3.

Specifically, the adjustment of the machining path (cutting route) and the adjustment of the cutting depth performed on the spindle 2 and the workpiece rotation mechanism 3 correspond to the action $a_t$, a value evaluated and calculated on the basis of the state $s_{t+1}$ newly obtained as a result of performing the action $a_t$ corresponds to a reward $r_{t+1}$, and the learning is carried out by applying these to a value function update expression in accordance with the machine learning algorithm.

Figure 2:
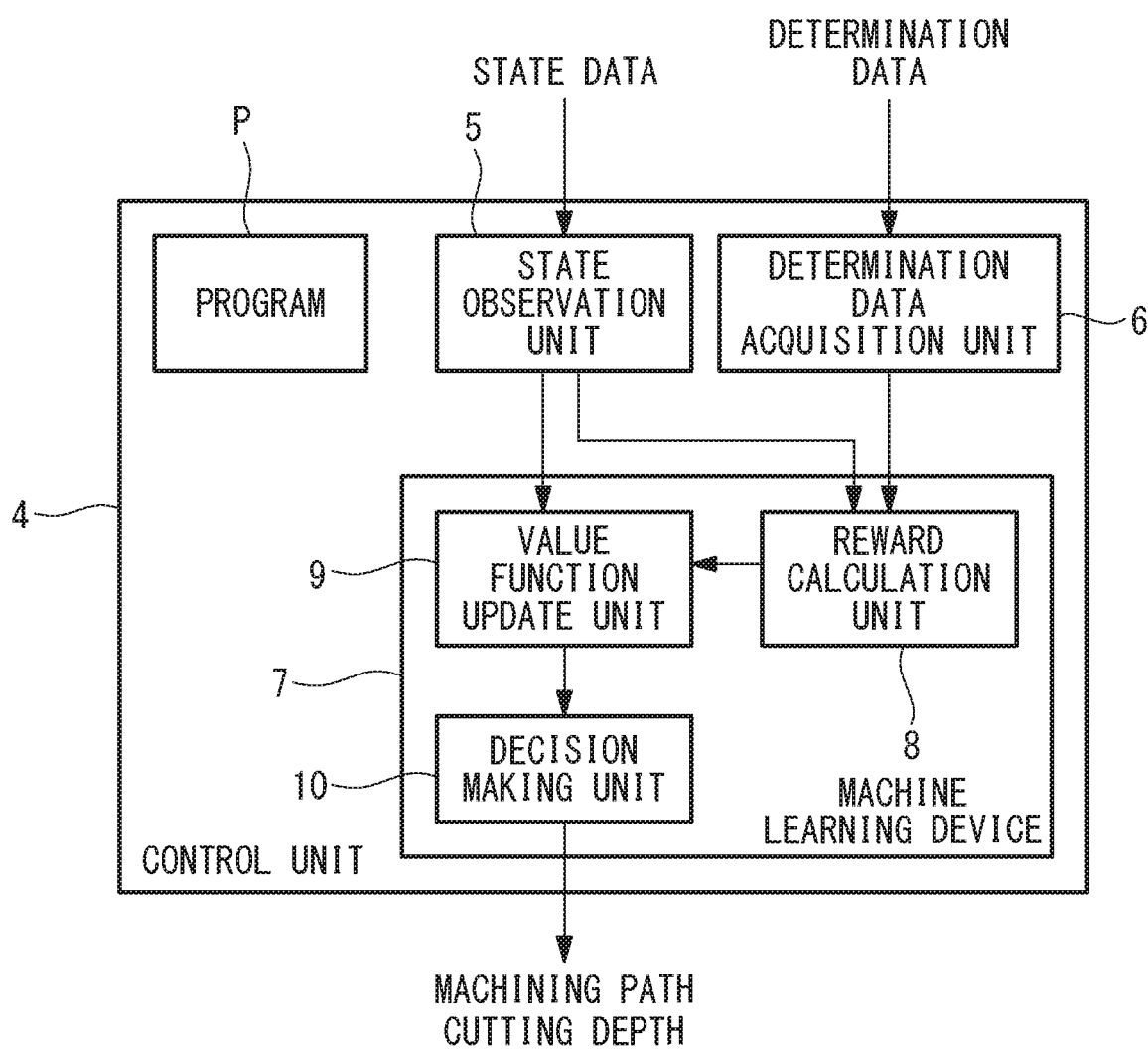
FIG. 2 is a block diagram illustrating an example of a control unit provided in the machine tool illustrated in FIG. 1.

The machine learning device 7 includes a reward calculation unit (reward computation unit) 8, a value function update unit (machining condition adjustment learning unit) 9, and a decision making unit (machining condition adjustment unit) 10. The machine learning device 7 may be provided in the control unit 4 or may be provided in a personal computer or the like outside the control unit 4 as illustrated in FIG. 2.

The reward calculation unit 8 calculates a reward using the state data and the determination data input from the state observation unit 5 or the determination data acquisition unit 6 on the basis of conditions under which a reward in the machine learning set by an operator or the like is provided and outputs the reward to the value function update unit 9.

The reward includes a positive reward and a negative reward and can be appropriately set.

The reward calculation unit 8 analyzes the data input from the state observation unit 5 and the determination data acquisition unit 6 on the basis of the set reward conditions and outputs the calculated reward to the value function update unit 9.

Hereinafter, examples of reward conditions set by the reward calculation unit 8 will be described.

"Reward 1: occurrence of abrasion/breakage of tool X (negative reward)"

When abrasion of the tool X of the amount that is not less than a predetermined reference value occurs during machining using the machine tool 1, a negative reward in accordance with the degree thereof is provided. When breakage of the tool X occurs, a negative reward is provided.

"Reward 2: occurrence of vibration (negative reward)"

When vibration of the amount that is not less than a predetermined reference value occurs during machining using the machine tool 1, a negative reward in accordance with the degree thereof is provided.

"Reward 3: motor load (positive reward, negative reward)"

When the measured motor load increases within such a range that the motor load does not exceed a predetermined reference value (predetermined load) during machining is performed after adjustment of previous machining conditions for the machine tool 1, a positive reward in accordance with the degree thereof is provided. When the predetermined reference value is exceeded or the motor load decreases, a negative reward is provided.

The value function update unit 9 performs machine learning on the basis of the state data acquired by the state observation unit 5 and the reward calculated by the reward calculation unit 8. The value function used for the learning is decided in accordance with the learning algorithm to be applied. When Q learning that is one of representative reinforcement learning algorithms is used, for example, learning is carried out by updating an action value function $Q(s_t, a_t)$ in accordance with Math. 1.

$$Q(S_t, a_t) \leftarrow Q(s_t, a_t) + a\left(r_{t+1} + \gamma \max_a Q(s_{t+1}, a) - Q(s_t, a_t)\right)$$

Here, $\alpha$ represents a learning coefficient, $\gamma$ represents a discount rate, and there are defined within ranges of $0<\alpha\leq1$ and $0<\gamma\leq1$.

The decision making unit 10 selects an action $a_t$ (an action with the highest value) with which the reward in the future $(r_{t+1}+r_{t+2}+\ldots)$ is the maximum in the current state $s_t$ using a value function produced through past learning. For the purpose of learning progress in the learning, a random action is also selected at a specific probability in selection of an action using the decision making unit 10 (ϵ greedy method).

Figure 4:
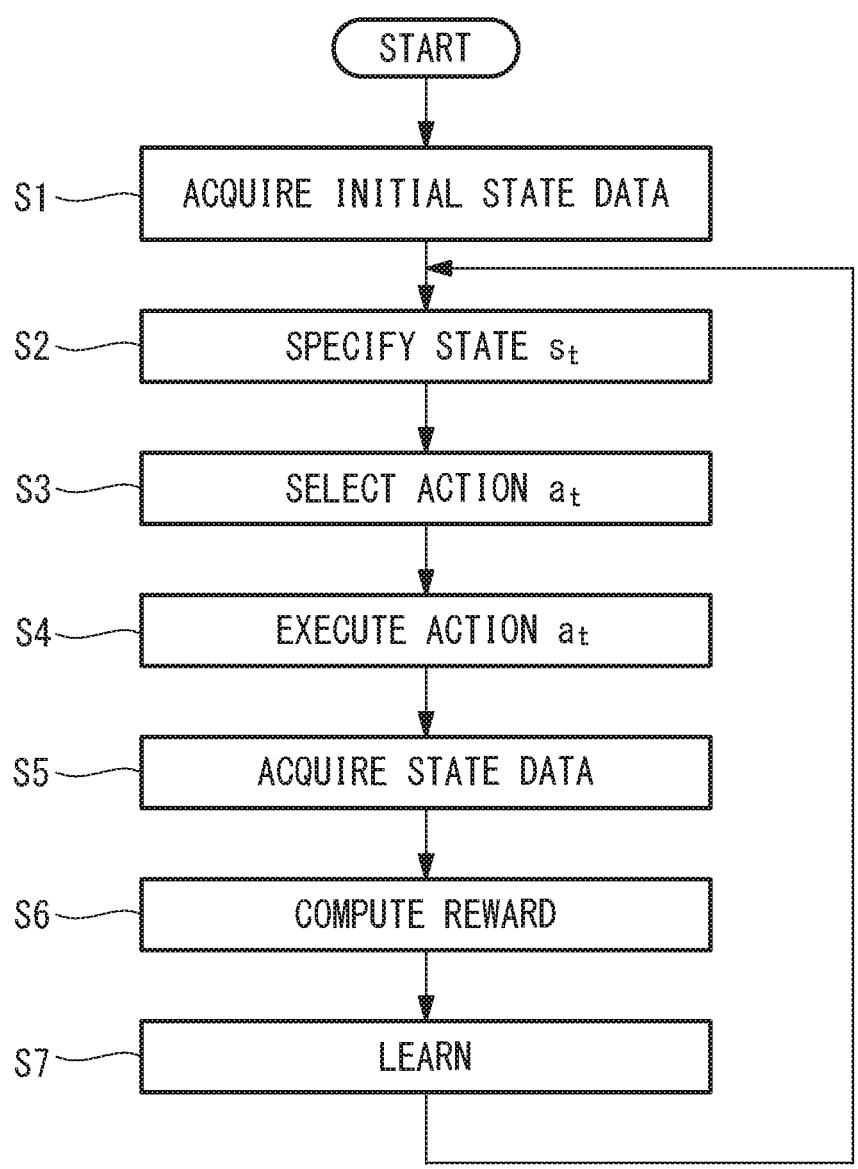
FIG. 4 is a flowchart illustrating a flow of machine learning in the machine tool illustrated in FIG. 1.

Referring to the flowchart in FIG. 4, a flow of the machine learning performed by the value function update unit 9 will be described.

First, if the machine learning is started, the state observation unit 5 acquires data related to a machining state of the machine tool 1, and the determination data acquisition unit 6 acquires determination data (Step S1).

The value function update unit 9 specifies a current state $s_t$ on the basis of the data related to the machining state, which has been acquired by the state observation unit 5, and the determination data, which has been acquired by the determination data acquisition unit 6 (Step S2).

The decision making unit 10 selects an action $a_t$ on the basis of a past learning result and the state $s_t$ specified in Step S2 (Step S3).

Next, the machine tool 1 executes the action $a_t$ selected in Step S3 (Step S4).

Then, acquisition of state data using the state observation unit 5 and acquisition of determination data using the determination data acquisition unit 6 are performed (Step S5). In this stage, the state of the machine tool 1 has changed due to the action $a_t$ executed in Step S4 with temporal transition from a clock time t to a clock time t+1.

The reward calculation unit 8 computes a reward $r_{t+1}$ on the basis of data of an evaluation result acquired in Step S5 (Step S6).

Then, the value function update unit 9 proceeds with the machine learning on the basis of the state $s_t$ specified in Step S2, the action $a_t$ selected in Step S3, and the reward $r_{t+1}$ computed in Step S6 (Step S7), and the processes from Step S2 are repeated.

In this manner, the machine learning device 7 proceeds with the learning by repeating (1) to (5) described above. It is possible to carry out the learning so as to be adapted to a new environment through additional learning even if the machine learning device 7 is placed in the new environment after learning ends in a certain environment. Through an application to adjustment of the machining path and the cutting depth performed by the control unit 4 that controls the machine tool 1 for machining the workpiece W, it is thus possible to learn the adjustment of the machining path and the like in a short time by performing additional learning in a new environment in addition to past learning of the adjustment of the machining path and the like even in an application to control of a new machine tool 1 according to the embodiment.

Figure 5:
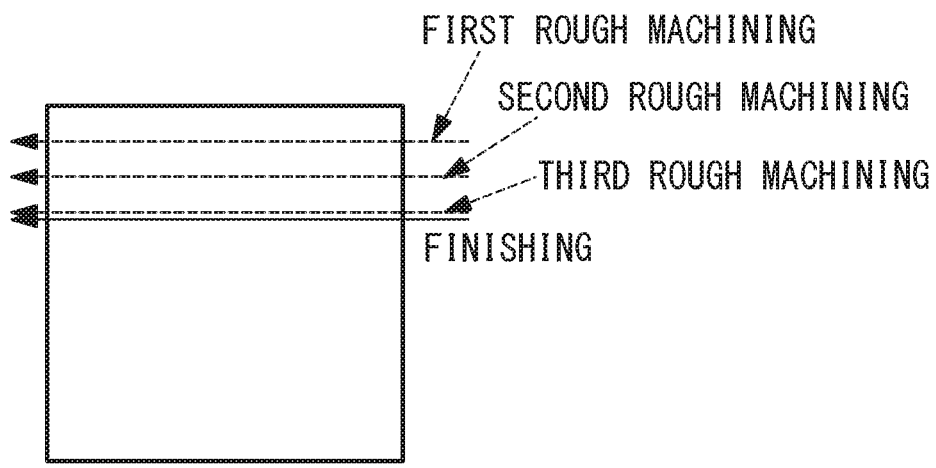
FIG. 5 is a schematic view for explaining a machining path in the related art of the machine tool.

When the machine tool 1 causes the tool X to rotate and move, causes the workpiece W to rotate in synchronization with the rotation and the movement of the tool X, and also performs machining such as hobbing, for example, rough machining is performed a plurality of times, for example, three times, and finishing is performed once, with a constant cutting depth maintained with respect to the workpiece W as illustrated in FIG. 5 in a case of a typical machining path.

Figure 6:
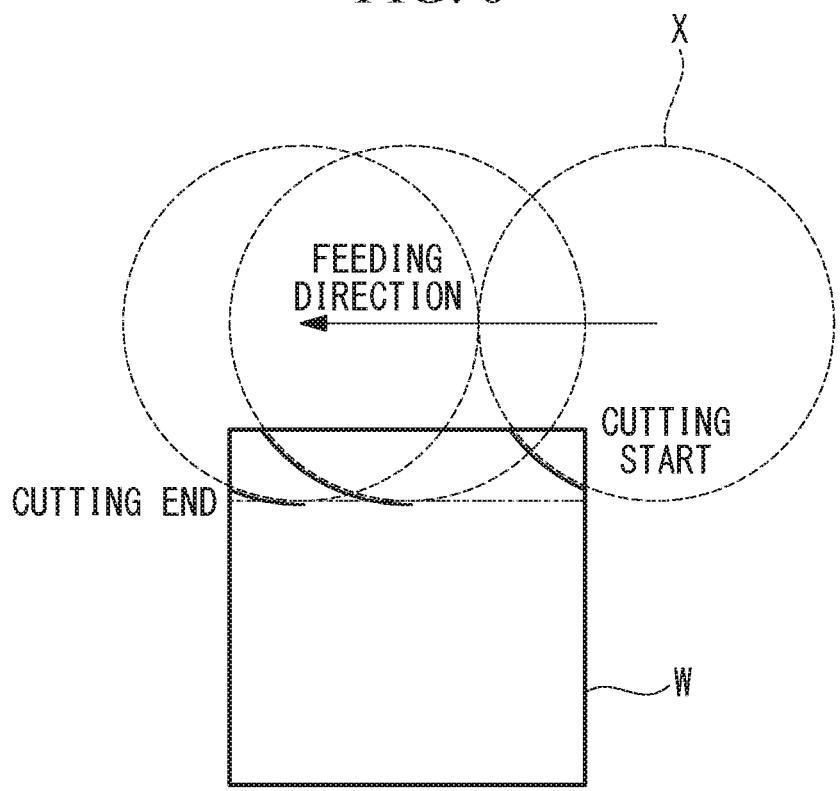
FIG. 6 is a schematic view for explaining the amount of contact between the tool and the workpiece in the machining path illustrated in FIG. 5.
Figure 7:
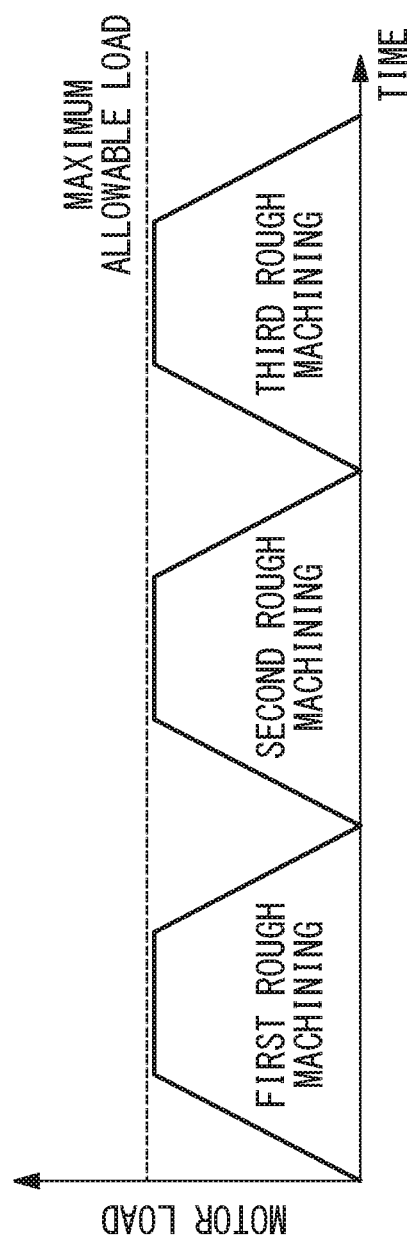
FIG. 7 is a graph illustrating a temporal change in motor load in rough machining performed three times through the machining path in FIG. 5.

In this case, since the amounts of contact between the tool X and the workpiece W are small at the time of starting the cutting of the workpiece W and at the time of ending the cutting of the workpiece W with the tool X as illustrated in FIG. 6 in rough machining, the motor load changes as illustrated in FIG. 7.

In this case, however, it takes a longer time to perform cutting at the time of starting cutting of the workpiece W and at the time of ending the cutting of the workpiece W, and the cutting time increases as a whole if such a cutting depth that the motor load during the cutting does not exceed the maximum allowable load (predetermined load) is set.

Figure 8:
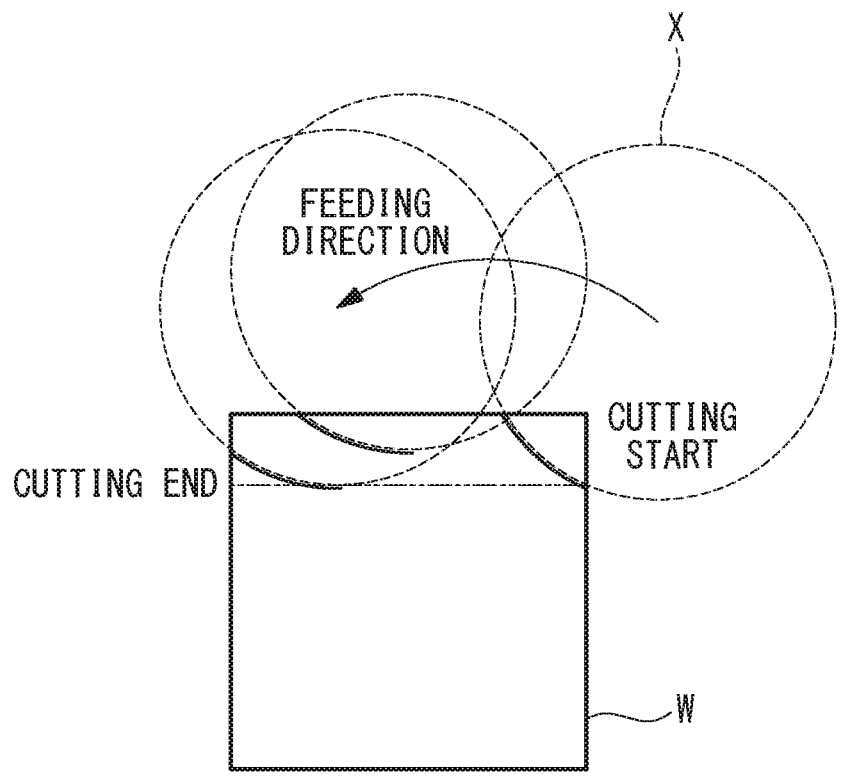
FIG. 8 is a schematic view for explaining the amount of contact between the tool and the workpiece in an optimized machining path of the machine tool illustrated in FIG. 1.

According to the embodiment, the machining path is adjusted in a direction in which the cutting load increases at the time of starting the cutting and at the time of ending the cutting when the cutting load is small, and the cutting depth at the time of starting the cutting and at the time of ending the cutting when the cutting load is small thus increases as illustrated in FIG. 8. That is, to obtain a constant cutting depth in the machining path in the related art, the amounts of contact between the tool X and the workpiece W at the time of starting the cutting and at the time of ending the cutting are small, and the room in the motor load is more than sufficient.

Figure 9:
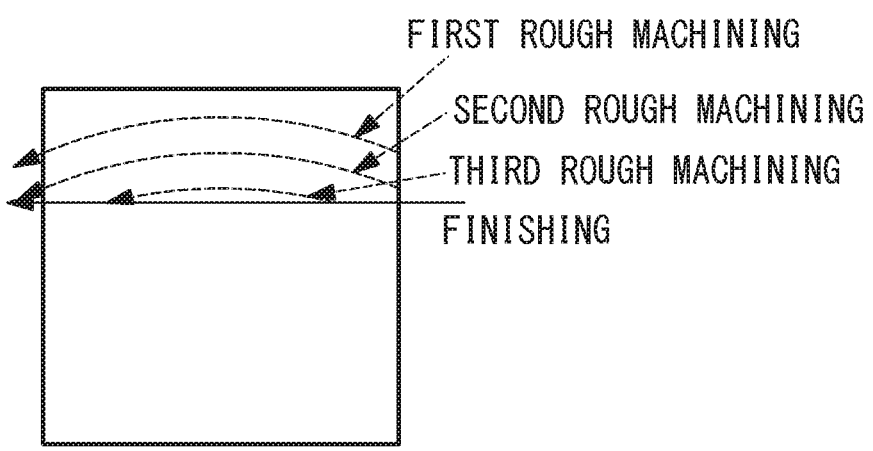
FIG. 9 is a schematic view for explaining the optimized machining path of the machine tool illustrated in FIG. 1.
Figure 10:
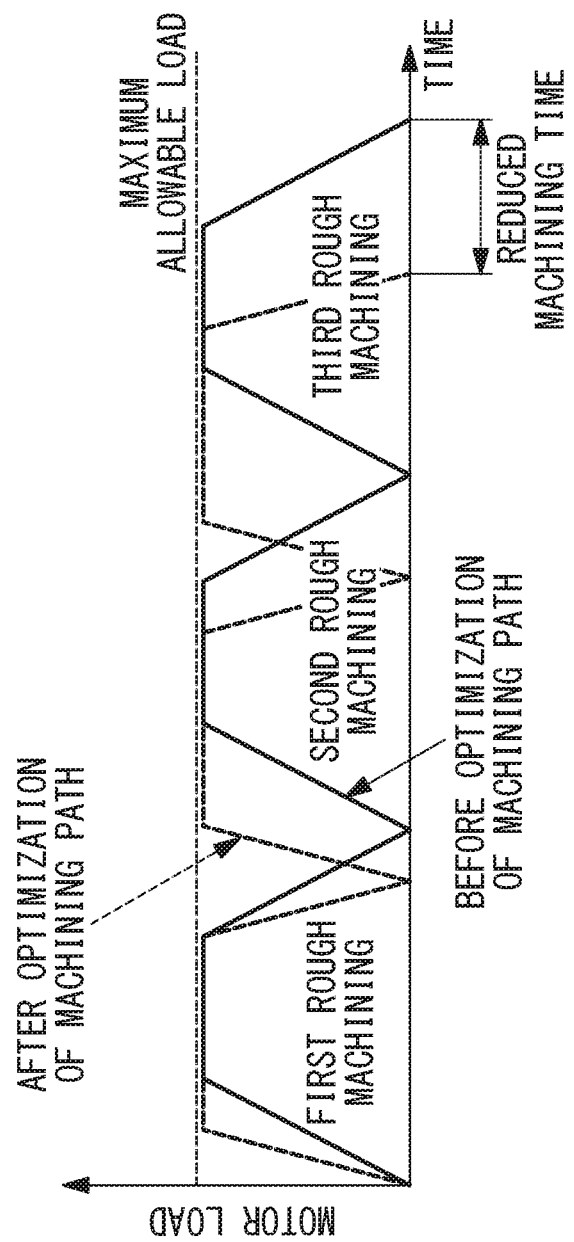
FIG. 10 is a graph illustrating a temporal change in motor load in rough machining performed three times through the machining path illustrated in FIG. 9 in comparison with the temporal change illustrated in FIG. 7.

Meanwhile, the embodiment employs the machining path that increases the cutting depth at the time of starting the cutting and at the time of ending the cutting when the cutting load is small as illustrated in FIG. 9. That is, the control unit 4 controls the spindle 2 in the direction in which the distance between the rotary axis of the workpiece W rotated by the workpiece rotation mechanism 3 and the rotary axis of the tool X rotated by the spindle 2 is longer in the region with the small motor load than in the region with the large motor load. This has an advantage that variation in the amount of cutting from the start of the cutting to the end of the cutting each time rough machining is performed is stabilized, the amount of cutting in rough machining performed once increases, the cutting time is reduced as a whole, and machining efficiency is thus improved, as illustrated in FIG. 10.

There is an advantage that it is possible to adjust the machining path in a direction in which the motor load decreases and thereby to curb occurrence of self-excited vibration due to a synchronization error between the rotation of the tool X and the rotation of the workpiece W by providing a negative reward to occurrence of vibration in the machining.

Although the action value function used in Q learning has been exemplified as a value function in the embodiment, a state value function used in TD learning, which is one of reinforcement learning algorithms, may be used instead. As the state value function, a state value function represented by Math. 2 can be exemplified.

$$V(s_t) \leftarrow V(s_t) + a[r_{t+1} + \gamma V(s_{t+1}) - V(s_t)]$$

In the reinforcement learning, a plurality of agents are connected with a network or the like to construct a system, information regarding states s, actions a, rewards r, and the like is shared among the agents and used for learning in the agents, and the respective agents can thus perform efficient learning through distributed reinforcement learning in which the respective agents carry out learning in consideration of environments of other agents as well. According to the embodiment, it is still possible to cause the plurality of agents that control a plurality of environments to efficiently learn adjustment of machining conditions performed by the control unit 4 that controls the machine tool 1 for machining the workpiece W through the distributed machine learning in a state in which the plurality of agents are connected via a network or the like.

As reinforcement learning algorithms, various methods such as Q learning, an SARSA method, TD learning, and an AC method are well-known, and any of the algorithms may be employed as an algorithm that is applied to the embodiment.

Although the case in which the control unit 4 optimizes, through the machine learning, the machining path such that the cutting depth of the workpiece W cut with the tool X in the region with the small motor load is greater than the cutting depth in the region with the large motor load within such a range that the motor load does not exceed a maximum allowable load has been described as an example in the embodiment, the embodiment is not limited thereto.

That is, the control unit 4 may control the spindle 2 in a direction in which the distance between the rotary axis of the workpiece W rotated by the workpiece rotation mechanism 3 and the rotary axis of the tool X rotated by the spindle 2 is longer in the region with the small motor load than in the region with the large motor load without using machine learning. The machining path may be optimized by repeating machining while changing the machining path within such a range that the motor load does not exceed the maximum allowable load.

Figure 11:
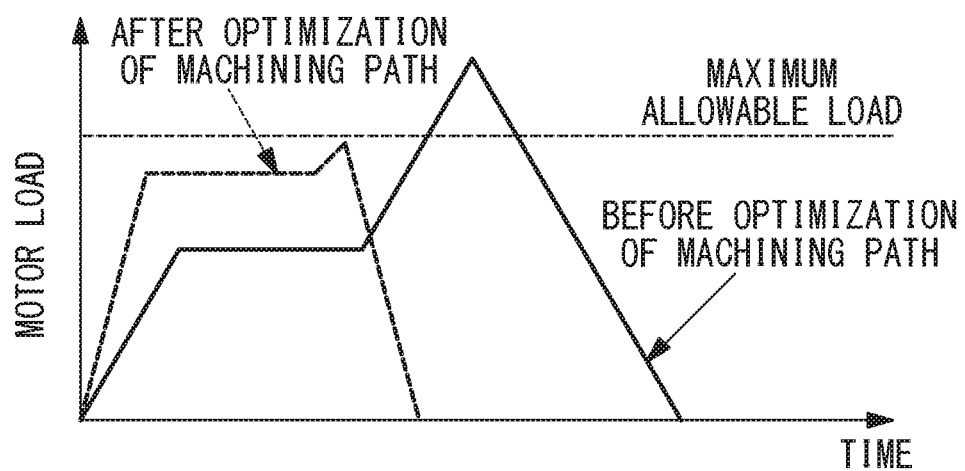
FIG. 11 is a graph illustrating an example of a pattern that is different from a pattern of the motor load illustrated in FIG. 7.
Figure 12:
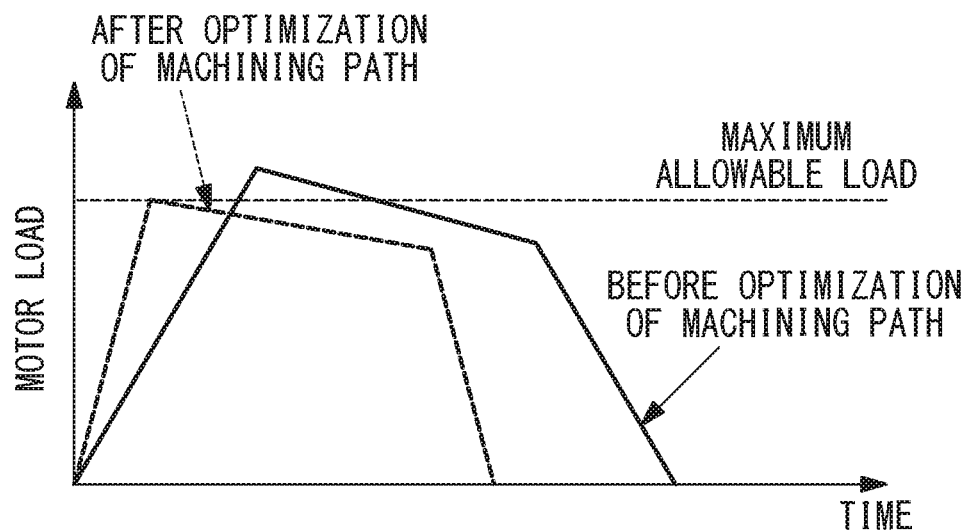
FIG. 12 is a graph illustrating another example of a pattern that is different from the pattern of the motor load illustrated in FIG. 7.

The form of the motor load that optimizes the machining path according to the embodiment is not limited to the trapezoidal form as illustrated in FIGS. 7 and 10, and the embodiment may be applied to a motor load in an arbitrary form as illustrated in FIGS. 11 and 12.

As a result, the above-described embodiment leads to the following aspect.

An aspect of the invention is directed to a machine tool including: a spindle that causes a tool to rotate and move; a workpiece rotation mechanism that causes a workpiece to rotate; a control unit that controls the spindle and the workpiece rotation mechanism in accordance with commands from a program; and a cutting load detection unit that detects a cutting load imparted on the workpiece by the tool, in which the control unit controls a cutting route such that a cutting depth of the workpiece cut with the tool in a region with a small cutting load is greater than the cutting depth in a region with a large cutting load within such a range that the cutting load detected by the cutting load detection unit does not exceed a predetermined load.

According to the aspect, it is possible to machine the workpiece through the cutting route that increases the cutting load in the region with the smaller cutting load by setting the cutting depth to be greater in the region with the small cutting load imparted on the workpiece by the tool, which has been detected by the cutting load detection unit, than in the region with the large cutting load in a case in which the control unit controls the spindle and the work piece rotation mechanism in a synchronized manner and the workpiece attached to the workpiece rotation mechanism is cut with the tool attached to the spindle. Since a cutting route with a cutting load that does not exceed a predetermined load is typically selected in the region with the large cutting load, it is possible to efficiently perform machining and thereby to shorten a machining time by preventing the cutting load from becoming excessively large, preventing occurrence of self-excited vibration, and setting a deep cutting depth in the region with the small cutting load due to small contact between the workpiece and the tool.

In the aforementioned aspect, the control unit may control the spindle in a direction in which a distance between a rotary axis of the workpiece rotated by the workpiece rotation mechanism and a rotary axis of the tool rotated by the spindle is longer in the region with the small cutting load than in the region with the large cutting load.

With this configuration, it is possible to simply adjust the cutting route, to prevent occurrence of self-excited vibration in machining, and also to prevent working efficiency from being degraded.

In the aforementioned aspect, the control unit may include a machine learning device that performs machine learning of adjustment parameters for machining conditions and an amount of adjustment of the adjustment parameters in cutting performed on the workpiece with the tool, the machine learning device may include a state observation unit that acquires state data that is information indicating a machining state in the cutting, a reward computation unit that computes a reward on the basis of the state data and reward conditions, a machining condition adjustment learning unit that performs machine learning of adjustment of the machining conditions, and a machining condition adjustment unit that decides, as an adjustment action, target parameters for the adjustment of the machining conditions and the amount of adjustment on the basis of a result of the machine learning of the adjustment of the machining conditions performed by the machining condition adjustment learning unit and the state data and adjusts the machining conditions in the cutting on the basis of the adjustment action, in which the machining condition adjustment learning unit may perform machine learning of the adjustment of the machining conditions as the adjustment action on the basis of the state data acquired by the state observation unit after a machining operation based on the output machining conditions after the adjustment and the reward computed by the reward computation unit, and as the reward conditions, a negative reward is provided when vibration occurs, a positive reward is provided when the cutting performed on the workpiece with the tool increases the cutting load without exceeding a predetermined load range, and a negative reward is provided when the cutting load is decreased or the cutting load exceeds the predetermined load.

With this configuration, it is possible to simply decide, through machine learning, a cutting route capable of preventing occurrence of self-excited vibration in machining and also preventing machining efficiency from being degraded.

According to the invention, an effect that it is possible to prevent occurrence of self-excited vibration and to also prevent machining efficiency from being degraded in machining when synchronization between rotation and movement of the tool and rotation of a workpiece is required.

The invention claimed is:

1. A machine tool comprising:
a spindle that causes a tool to rotate and move;
a motor that causes a workpiece to rotate;
a sensor that detects a cutting load imparted on the workpiece by the tool; and
a controller that controls a cutting route of the spindle such that a first cutting depth of the workpiece cut with the tool at a start of the cutting route, in a first region with a first detected cutting load, is greater than a second cutting depth before an end of the cutting route, in a second region with a second detected cutting load larger than the first cutting load, within such a range that the detected cutting load does not exceed a predetermined load.

2. The machine tool according to claim 1, wherein the controller controls the spindle in a direction in which a distance between a rotary axis of the workpiece rotated by the motor and a rotary axis of the tool rotated by the spindle is closer together in the region with the first cutting load than in the region with the second cutting load.

3. The machine tool according to claim 1, wherein
the controller includes a machine learning device that performs machine learning of adjustment parameters for machining conditions and an amount of adjustment of the adjustment parameters in cutting performed on the workpiece with the tool,
the machine learning device is configured to:

acquire state data that is information indicating a machining state of the cutting performed, compute a reward on a basis of the state data and reward conditions, perform machine learning of adjustment of the machining conditions, and decide, as an adjustment action, target parameters for the adjustment of the machining conditions and the amount of adjustment on a basis of a result of the performed machine learning of the adjustment of the machining conditions and the state data and adjust the machining conditions in the cutting on a basis of the adjustment action, the machine learning of the adjustment of the machining conditions is performed as the adjustment action on a basis of the acquired state data and the computed reward, and as the reward conditions, a negative reward is provided when vibration occurs, a positive reward is provided when the cutting performed on the workpiece with the tool increases the cutting load without exceeding a predetermined load range, and a negative reward is provided when the cutting load is decreased or the cutting load exceeds the predetermined load.

* * * * *